May 24, 1927.

W. HESSLINK

SPRING SUSPENSION FOR VEHICLES

Filed Aug. 2, 1926

1,629,868

INVENTOR:
William Hesslink
By Macleod, Calver, Copeland & Dike
Attys.

Patented May 24, 1927.

1,629,868

UNITED STATES PATENT OFFICE.

WILLIAM HESSLINK, OF ASHLAND, MASSACHUSETTS, ASSIGNOR TO LEROY F. FULLER, OF SPRINGFIELD, MASSACHUSETTS.

SPRING SUSPENSION FOR VEHICLES.

Application filed August 2, 1926. Serial No. 126,421.

The invention relates to an improvement in spring suspension for vehicles and particularly to that class of vehicles equipped with springs extending parallel to and above the axle. It is more especially intended for use on motor vehicles of the Ford type but not limited strictly to Ford motor vehicles. The invention may be applied to any vehicle whether motor driven or otherwise propelled to which the invention may be adapted.

The Ford motor vehicles have certain standard equipment to which the present invention may be applied.

In the ordinary construction of the spring suspension for Ford vehicles, the spring comprises a single member of the semi-elliptic type extending parallel to and above the axle and is connected by means of shackles to spring perches secured to the axle. These shackles are ordinarily loosely connected at both ends, being connected at one end with the perch and at the other end with the eye of the spring. This is ordinarily the case with the shackles at both ends of the spring, that is, on each side of the car. This loose connection makes them free to move on their pivots, and therefore permits the body of the car to sway sidewise on the running gear, thus making the steering difficult. This swaying motion is especially pronounced at sharp turns in the road and not only makes steering difficult at those places but also exerts a strong end thrust on the bearings. One object of the present invention is to prevent side body sway in the vehicle and thereby make steering easier by providing a spring suspension at the front of the vehicle having a fixed shackle or shackles connecting the spring with the axle at one end of the spring and movable shackles at the other end of the spring. Other objects of the invention will be clearly pointed out in the following specification.

The invention will be fully understood from the following description when taken in connection with the accompanying drawings and the novel features thereof will be pointed out and clearly defined in the claims at the close of this specification.

Figure 1:
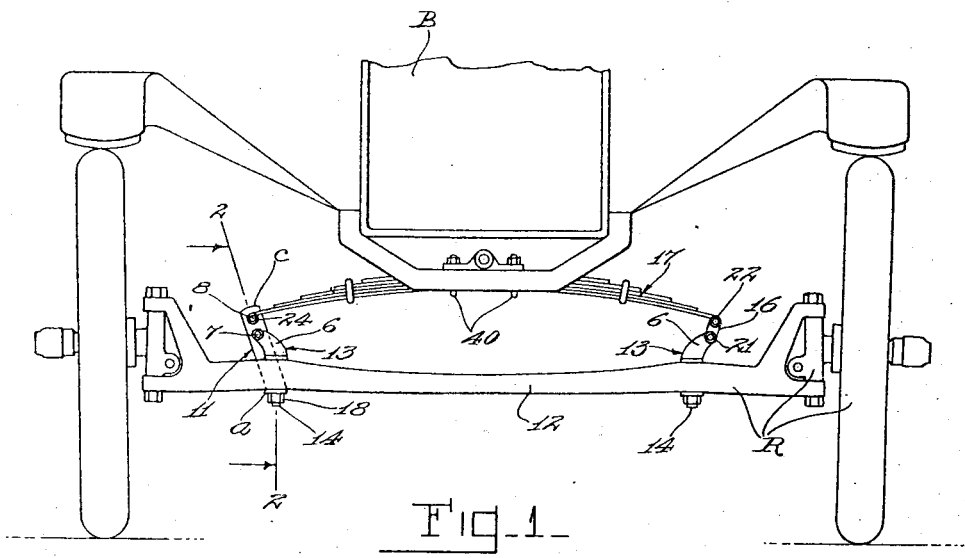
Fig. 1 is a front elevation of a vehicle of the Ford type equipped with a spring suspension embodying the invention, unnecessary parts of the vehicle being omitted.
Figures 3, 4, 5:
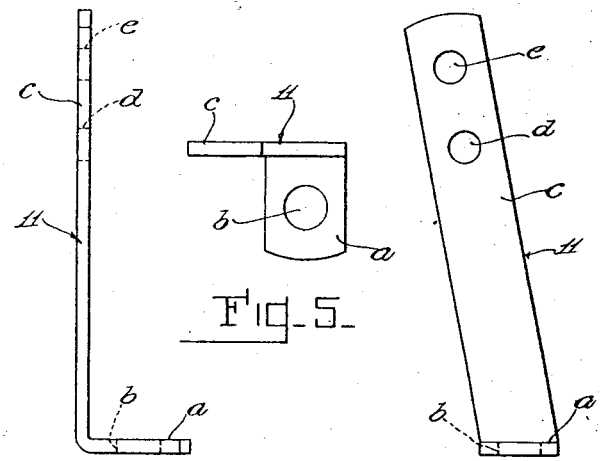
Figs. 3 and 4 are detail views in front and side elevation respectively of one of the fixed shackles employed at one end of the spring suspension.
Fig. 5 is a plan view of the shackle shown in Figs. 3 and 4.

Referring to the drawings and particularly to Figs. 3, 4 and 5, at 11 is shown a shackle embodying the invention which is to constitute the fixed shackle. This is preferably made of steel in the form of an angle plate and comprises a substantially horizontal flat portion $a$ and an upwardly extending portion $c$ at right angles thereto as shown in side elevation in Fig. 4 but extending at a slight angular inclination to the horizontal portion $a$ as shown in Figs. 1 and 3. The horizontal portion $a$ has a bolt hole $b$ and the upwardly extending portion $c$ has bolt holes $d$ and $e$ located near its upper end and at a slight distance apart from each other. The angular relation of the two portions $a$ and $c$ of the shackle is such as to properly register the bolt holes $b$ and $d$ with the bolt holes in certain portions of one of the standard spring perches such as heretofore employed in the construction of Ford motor vehicles and the distance between the holes $d$ and $e$ is preferably equal to the distance between the holes in one of the standard spring shackles of the Ford type. This relative position of the holes is to enable the invention to be applied to use so far as is possible with the standard parts of the Ford motor vehicles as now constructed so as to avoid the necessity of making special parts more than necessary.

The three holes $b$, $d$ and $e$ are of proper size and relative position to receive the three bolts such as are now used in assembling one end of the standard spring suspension. The manner of their application in the construction shown in the drawings as embodying the present invention will be hereinafter more fully described.

Figure 2:
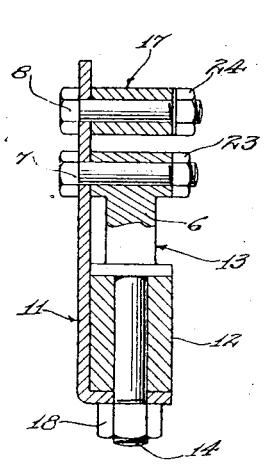
Fig. 2 is an enlarged section taken on line 2—2, Fig. 1.

Referring now to Figs. 1 and 2, at B there is shown the body and at R the running gear of a standard Ford motor vehicle equipped with a front spring suspension embodying the invention and extending transversely of the car and parallel to and above the front axle 12. At 13, 13 at the opposite ends of the axle there are shown two spring perches each of which is of standard construction having a bolt member 14 formed integral with the perch extending vertically downward from an angularly offset upper portion 6. In the ordinary assembly, however, of the parts in Ford cars the perches are so positioned that the angular portions 6 of the two perches at the opposite ends of the axle will be inclined toward each other. In the method of assembling in the construction embodying the present invention, the said perches are positioned so that they will be inclined away from each other as shown in Fig. 1.

The special form of shackle embodying the present invention already described is employed at only one side of the vehicle, that is, in connection with one end of the spring, and the ordinary shackle such as is shown at 16 is employed at the other end of the spring. It is immaterial at which end the fixed shackle is located. In the drawings the special form of shackle is shown at the left-hand side as viewed in Fig. 1, and the ordinary spring shackle 16 is shown at the other side of the vehicle. It is understood that there are a pair of these spring shackles 16 parallel with each other at one end of the spring but only one is shown in Fig. 1 as the two would be shown only in side view. The said shackles 16 are secured in the ordinary way, that is, are pivotally secured at their lower ends to the perch 13 by a bolt 21 and at their upper ends as at 22 by a bolt passing through the eye of the spring 17. At the other end of the spring on the other side of the vehicle, a single spring shackle 11 is employed instead of a pair of shackles of the ordinary type 16 already described at the right-hand end. In assembling this shackle 11 with the perch and spring the nut 18 which is screwed on the lower end of the bolt member 14 of the perch 6 should be removed and then the shackle 11 should be so positioned that the horizontal portion $a$ comes up against the bottom of the axle 12 with the lower end of the bolt member 14 passing through the bolt hole $b$ and the nut 18 is again screwed on to the lower end of the bolt 14, thus securely clamping the shackle 11 to the axle. The upright portion $c$ of the shackle extends upwardly against the forward face of the axle or adjacent thereto and inclines outwardly toward the end of the axle as shown in Fig. 1. A bolt 7 which may be the same kind of a bolt as ordinarily used for attaching the standard shackles to the perch is then passed through the hole $d$ in the portion $c$ of the shackle 11 and through the hole in the upper end of the perch 13, said two holes being in alinement with each other after the shackle has been positioned as previously described. A nut 23 is then screwed onto the end of the bolt 7 thereby securely clamping this portion of the shackle 11 to the perch. The eye 24 at this end of the spring 17 is then brought into alinement with the hole $e$ in the upright portion $c$ of the shackle 11 and a bolt 8 which may be similar to the ordinary bolt for clamping the spring to the standard shackles is then inserted and the nut 24 screwed onto the end thereof to clamp the parts together. The shackle 11 will thus be held rigid, without any movement whatever.

By reason of the perches 13, 13 being inclined away from each other instead of toward each other as in the ordinary assembly heretofore described, the spring 17 will necessarily have to be a little longer than if the said perches were inclined toward each other, assuming that the bolt holes in the axle to receive the bolts of the perches are located as in the ordinary standard construction. It will be seen that the perches at both ends of the spring suspension are of standard construction only reversed in direction of inclination as already described, also that the loose shackles at one end are of standard construction. At the opposite end of the spring suspension the ordinary standard shackle is replaced by the single shackle 11 which is rigidly connected with the axle and the perch and the only new parts required are the specially constructed spring shackle 11 and the spring member 17 which is of similar form and construction as the standard type spring, but longer. The spring 17 is attached to the body $b$ by the same means as heretofore employed as indicated at 40 in Fig. 1.

By the form of construction above described, the spring 17 at one end still has a loose connection with the perch by reason of the pivotal connection of the shackle 16 at that end but at the other end of the spring the shackle 11 is immovably fixed by reason of its rigid connection with the axle. This prevents side swaying of the body of the vehicle and also makes the steering much easier than heretofore. Furthermore due to the fact that a longer spring member 17 is employed, the riding qualities of the car are increased.

What I claim is:

1. A spring suspension for a vehicle having in combination with an axle, a spring extending transversely of the body of the vehicle, a shackle having one end secured to one end of the spring and a perch having a bolt portion which rigidly secures the other end of the said shackle to the axle, the other end of the spring having a loose connection with the axle.

2. A spring suspension for a vehicle having in combination with an axle a spring extending transversely of the body of the vehicle, a shackle pivotally connected at one end with one end of the spring, and having at its other end an arm which extends adjacent the axle, a perch rigidly mounted on the axle, means for rigidly connecting one end of said perch with the axle and with said adjacent arm of the shackle, and means for rigidly connecting the other end of said perch with the shackle intermediate the axle and the spring.

3. A spring suspension for vehicles having an axle, a spring having at one end thereof a fixed shackle comprising an angle bar having a horizontal arm through which the bolt of a perch passes to secure the shackle rigidly to the perch and axle, the other arm extending upwardly above the axle and secured to one end of the spring, the other end of the spring having a loose shackle connection with a perch mounted on the axle.

4. A spring suspension for vehicles having an axle, a spring having at one end thereof a fixed shackle comprising an angle bar having one arm rigidly connected with the axle, the other arm of said shackle extending upwardly above the axle and secured to one end of the spring, the other end of the spring having a loose shackle connection with the axle.

5. A spring suspension for vehicles having an axle, a spring having at one end thereof a fixed shackle comprising an angle bar having a horizontal arm through which the bolt of a perch passes to secure the said shackle rigidly to the perch and axle, the other arm of said angle bar extending upwardly above the axle and secured to one end of the spring, the other end of the spring having a loose shackle connection with a perch mounted on the axle, the perches at both ends of the spring being upwardly inclined away from each other toward the ends of the axle.

6. A spring suspension for vehicles having an axle, a spring having at one end thereof a fixed shackle comprising an angle bar having a horizontal arm through which the bolt of a perch passes to secure the shackle rigidly to the perch an axle, the other arm of said angle bar extending upwardly above the axle and secured to one end of the spring, the other end of the spring having a loose shackle connection with a perch mounted on the axle, the perches at both ends of the spring being upwardly inclined away from each other toward the ends of the axle, the upwardly extending arm of said fixed shackle being also inclined outwardly toward the end of the axle.

7. A spring suspension for a vehicle having in combination with an axle, a spring extending transversely of the body of the vehicle above the axle, a shackle consisting of an angle bar having a horizontal arm bearing against the underside of the axle and an upright arm extending upwardly adjacent one side face of the axle, a perch having a bolt portion which passes down through a hole in the axle and through said horizontal arm of the shackle, a nut on the end of said bolt of the shackle which clamps the said horizontal member and rigidly secures the said arm to the axle and rigidly secures the said shackle to the axle, the upwardly extending arm of the said shackle being formed with two bolt holes one above the other, a bolt which passes through the upper portion of the perch and through one of said holes in the shackle and is provided with a nut thereby rigidly clamping the perch to the upper arm of the shackle and a bolt which passes through the other hole in the upwardly extending arm and through an eye in one end of the spring and means for holding said last bolt in operative connection with the shackle and spring.

In testimony whereof I affix my signature.

WILLIAM HESSLINK.